(12) United States Patent
Casey et al.

(10) Patent No.: US 8,214,658 B2
(45) Date of Patent: Jul. 3, 2012

(54) ENHANCED THERMAL MANAGEMENT FOR IMPROVED MODULE RELIABILITY

(75) Inventors: Jon A. Casey, Poughkeepsie, NY (US); Michael S. Floyd, Cedar Park, TX (US); Soraya Ghiasi, Boulder, CO (US); Kenneth C. Marston, Poughquag, NY (US); Jennifer V. Muncy, Ridgefield, CT (US); Malcolm S. Ware, Austin, TX (US); Roger D. Weekly, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 12/194,620

(22) Filed: Aug. 20, 2008

(65) Prior Publication Data

US 2010/0049995 A1 Feb. 25, 2010

(51) Int. Cl.
*G06F 1/00* (2006.01)
(52) U.S. Cl. ....................................... 713/300
(58) Field of Classification Search .................. 713/300, 713/320, 322
See application file for complete search history.

(56) References Cited

U.S. PATENT DOCUMENTS

| | | | |
|---|---|---|---|
| 5,481,210 A | 1/1996 | Genzel | |
| 5,943,206 A | 8/1999 | Crayford | |
| 6,212,644 B1 | 4/2001 | Shimoda et al. | |
| 6,260,998 B1 | 7/2001 | Garfinkel et al. | |
| 6,363,490 B1 | 3/2002 | Senyk | |
| 6,847,911 B2 | 1/2005 | Huckaby et al. | |
| 6,908,227 B2 | 6/2005 | Rusu et al. | |
| 7,129,557 B2 | 10/2006 | Berndlmaier et al. | |
| 7,214,910 B2 | 5/2007 | Chen et al. | |
| 7,293,186 B2 | 11/2007 | Thomas et al. | |
| 2005/0268133 A1* | 12/2005 | Beard | 713/323 |
| 2005/0273208 A1* | 12/2005 | Yazawa et al. | 700/299 |
| 2006/0255924 A1 | 11/2006 | Ray et al. | |
| 2009/0265568 A1* | 10/2009 | Jackson | 713/320 |
| 2010/0049466 A1 | 2/2010 | Casey et al. | |

OTHER PUBLICATIONS

Notice of Allowance mailed Nov. 18, 2010 for U.S. Appl. No. 12/194,606; 5 pages.
Response to Office Action filed with the USPTO on Jul. 2, 2010 for U.S. Appl. No. 12/194,606; 43 pages.
Supplemental Notice of Allowability mailed Jan. 10, 2011 for U.S. Appl. No. 12/194,606; 3 pages.
USPTO U.S. Appl. No. 12/194,606.

(Continued)

*Primary Examiner* — Kim Huynh
*Assistant Examiner* — Brandon Kinsey
(74) *Attorney, Agent, or Firm* — Francis Lammes; Stephen J. Walder, Jr.; Diana R. Gerhardt

(57) ABSTRACT

Mitigating effects of delamination of components in the data processing system is provided. A signal is received from one or more sensors in the data processing system. A determination is made as to whether the signal indicates that one threshold in a plurality of thresholds has been reached or exceeded. Responsive to the signal indicating that one threshold in the plurality of thresholds has been reached or exceeded, a determination is made as to whether the one threshold is a low temperature threshold or a high temperature threshold. Responsive to the one threshold being a low temperature threshold, one of a plurality of actions is initiated to increase a temperature of the data processing system thereby mitigating effects of delamination of the components in the data processing system.

22 Claims, 4 Drawing Sheets

OTHER PUBLICATIONS

Cui, Helen, "Accelerated Temperature Cycle Test and Coffin-Manson Model for Electronic Packaging", Reliability and Maintainability Symposium 2005, Jan. 24-27, 2005, Proceedings. Annual, pp. 556-560.

Ghaffarian, Reza, "Accelerated Thermal Cycling and Failure Mechanisms for BGA and CSP Assemblies", Journal of Electronic Packaging, vol. 122, Issue 4, Dec. 2000, 7 pages.

Smith et al., "Self-Consistent Temperature Compensation for Resonant Sensors With Application to Quartz Bulk Acoustic Wave Chemical Sensors", Transducers, Jun. 1995, http://www.sandia.gov/mstc/technologies/micromachines/tech-info/bibliography/docs/Tr95voc.pdf, 5 pages.

Interview Summary mailed Jul. 8, 2010 for U.S. Appl. No. 12/194,606; 3 pages.

* cited by examiner

US 8,214,658 B2

ENHANCED THERMAL MANAGEMENT FOR IMPROVED MODULE RELIABILITY

GOVERNMENT RIGHTS

This invention was made with United States Government support under Agreement No. HR0011-07-9-0002 awarded by DARPA. THE GOVERNMENT HAS CERTAIN RIGHTS IN THE INVENTION.

BACKGROUND OF THE INVENTION

1. Field of the Invention

The present application relates generally to an improved data processing apparatus and method and more specifically to an apparatus and method for enhanced thermal management for improved module reliability.

2. Background of the Invention

As computer and other electronic systems have increased performance over time, the power consumed to enable the performance has increased dramatically. Up until recently power management has mostly been a reliability issue associated with the max temperatures components or subassemblies may experience. However, a system behavior which requires significant power during periods of high production, but requires very little power consumption during idle or low production periods, will tend to experience large variations in temperature depending upon the nature of the thermal cooling paths and the work load demands on the system. These temperature variations may cause failures due to mechanical stress and strain induced fatigue for structures that are composed of materials with varying coefficients of thermal expansion (CTE). Too many temperature cycles of too high a magnitude or too low of magnitude may result in such failures.

BRIEF SUMMARY OF THE INVENTION

In one illustrative embodiment, a method, in a data processing system, is provided for mitigating effects of delamination of components in the data processing system. The illustrative embodiments receive a signal from one or more sensors in the data processing system. The illustrative embodiments determine if the signal indicates that one threshold in a plurality of thresholds has been reached or exceeded. The illustrative embodiments determine if the one threshold is a low temperature threshold or a high temperature threshold in response to the signal indicating that one threshold in the plurality of thresholds has been reached or exceeded. The illustrative embodiments initiate one of a plurality of actions to increase a temperature of the data processing system thereby mitigating effects of delamination of the components in the data processing system in responsive to the one threshold being a low temperature threshold.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
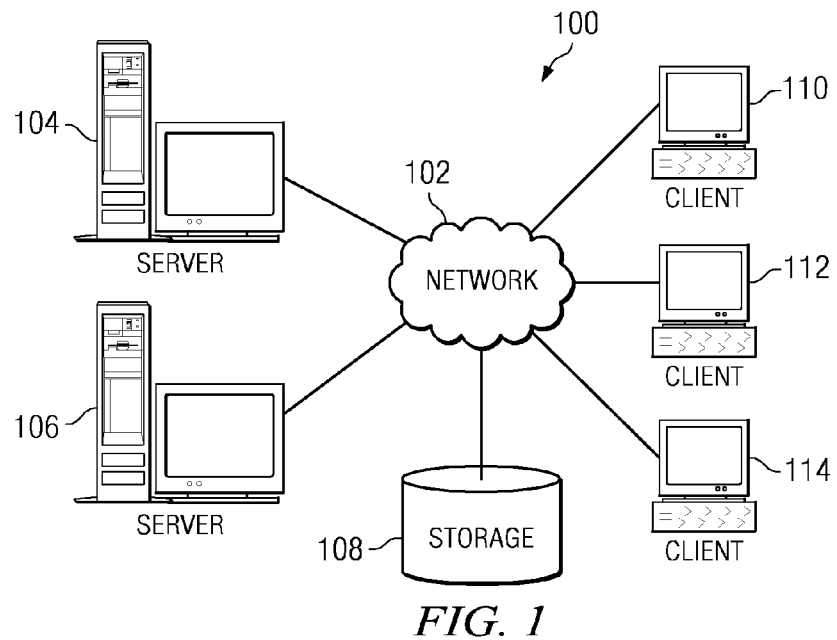
FIG. 1 depicts a pictorial representation of an exemplary distributed data processing system in which aspects of the illustrative embodiments may be implemented.

As will be appreciated by one skilled in the art, the present invention may be embodied as an apparatus, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments provide a mechanism that mitigates the effects of delamination of organic packages (i.e. components, modules, or the like) in a data processing system due to thermal stress while allowing as much power as possible to be saved in the data processing system. Delamination is a mode of failure of laminated composite materials and repeated cyclic stresses, impact, and so on, that may cause layers to separate, forming a mica-like structure of separate layers, with significant loss of mechanical toughness. Delamination is an insidious kind of failure as it develops inside of the material, without being obvious on the surface, much like metal fatigue.

Figure 2:
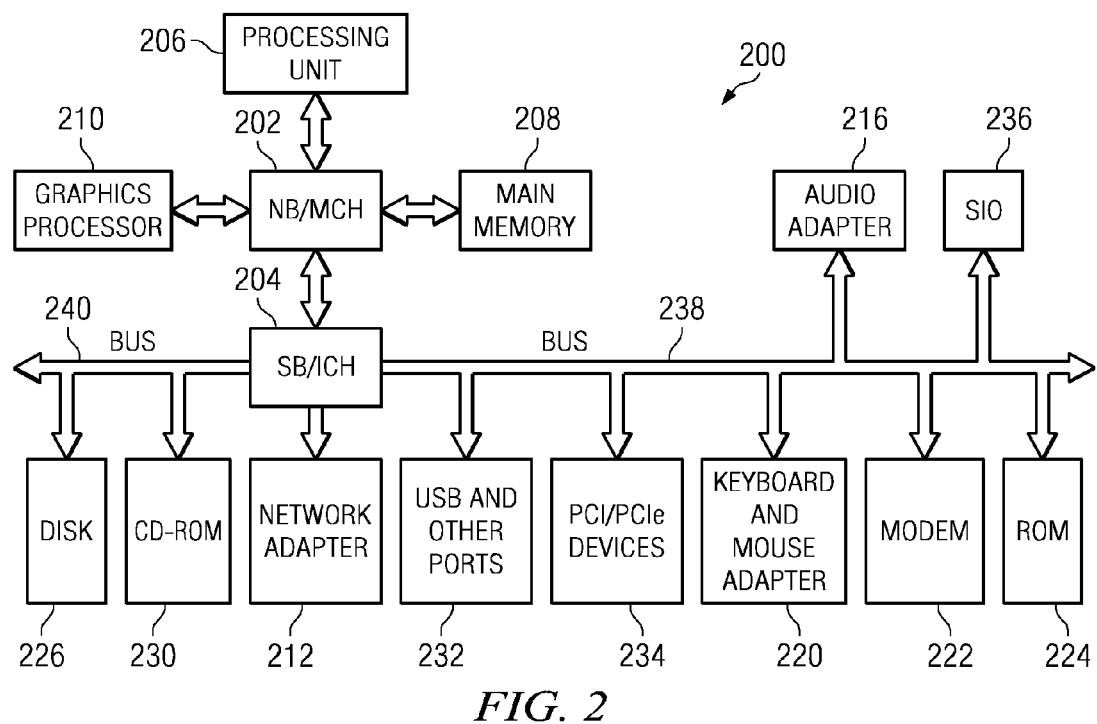
FIG. 2 depicts a block diagram of an exemplary data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as exemplary environments in which exemplary aspects of the illustrative embodiments may be implemented. While the description following FIGS. 1 and 2 will focus primarily on a single data processing device implementation of a mechanism that mitigates the effects of delamination of organic packages in the data processing system due to thermal stress, this is only exemplary and is not intended to state or imply any limitation with regard to the features of the present invention. To the contrary, the illustrative embodiments are intended to include distributed data processing environments and embodiments in which the effects of delamination of organic packages in a data processing system due to thermal stress may be mitigated.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
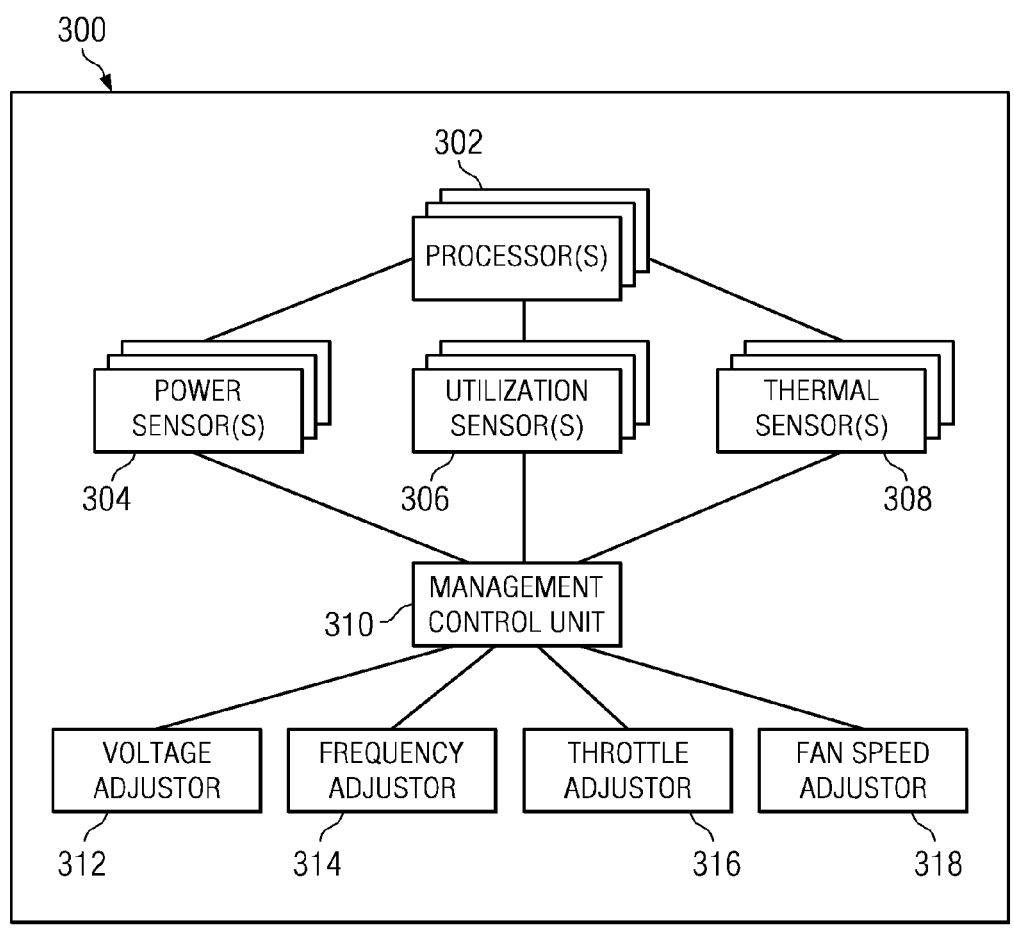
FIG. 3 depicts a functional block diagram of a data processing system that mitigates the effects of delamination of organic packages due to thermal stress in accordance with an illustrative embodiment.

FIG. 3 depicts a functional block diagram of a data processing system that mitigates the effects of delamination of organic packages due to thermal stress in accordance with an illustrative embodiment. Data processing system 300 may comprise one or more of processors 302 which have associated sensors, such as power sensors 304, utilization sensors 306, thermal sensors 308, or the like. Power sensors 304 monitor the power consumed by each of processors 302 and send the detected power usage values to management control unit 310. Likewise, utilization sensors 306 may monitor the workload performed by each of processors 302 and send detected utilization values to management control unit 310. Similarly, thermal sensors 308 are positioned adjacent to areas within data processing system 300 that typically experience the greatest variance in temperature during the execution of most applications, such as adjacent to processor 302. Thermal sensors monitor the temperature associated with these areas and send the detected temperature values to management control unit 310.

Management control unit 310 uses the power usage values, utilization values, and temperature values to control the voltage, frequency, workload, and cooling associated with each or processors 302 using mechanisms such as voltage adjustor 312, frequency adjustor 314, throttle adjustor 316, and fan speed adjustor 318, respectively. Management control unit 310 may use one or more thresholds to adjust one or more of the voltage, frequency, workload, and cooling associated with each or processors 302 based on any one of the detected power usage values, utilization values, and temperature values. For example, if thermal sensors 308 detect an exceedingly high temperature associated with an a specific processor, management control unit 310 may use a first high threshold to increase the fan speed using the fan speed adjustor 318 and a second high threshold to throttle back the workload of the processor using throttle adjustor 316 until the temperature sensed by thermal sensors 308 returns to a nominal temperature. While the first high threshold and the second high threshold may be the same threshold, the first high threshold may be set at a predetermined level lower than the second high threshold to account for the response time required to control the fan speed. That is, because fan control response time may be on a much longer time scale, e.g. 10 seconds, than adjusting one or more of the voltage, frequency, or workload, the actions to increase the fan speed may require activation earlier so that dynamics in the temperature are managed in a timely manner.

Thus, management control unit 310 protects processors 302, as well as other components in data processing system 300, that may be subject to delamination from exceedingly high temperatures. Again, delamination is a mode of failure of laminated composite materials and repeated cyclic stresses, impact, and so on, that may cause layers to separate, forming a mica-like structure of separate layers, with significant loss of mechanical toughness. One of the cyclic stresses that components, such as processors 302, encounter within data processing system 300 is variance in operating temperatures. While known systems respond to exceedingly high temperatures detected within data processing system 300, the illustrative embodiments respond to both exceedingly high and exceedingly low temperatures.

That is, data processing system components, in addition to having a "higher bound" where delamination may occur, also have a "lower bound" that may cause delamination. The lower bound is based on any of the system components approaching their minimum temperature point where one would consider that the component will have experienced a "temperature cycle" as described above. If a system component approaches this temperature cycle "minimum temperature", the illustrative embodiments may respond to increase the temperature of data processing 300. For example, if thermal sensors 308 detect an exceedingly low temperature associated with a specific processor, management control unit 310 may use a second low threshold to increase the frequency of that specific processor using frequency adjustor 314 so that the frequency is more uniform with a nominal temperature range for the specific processor. While the frequency increase is not good for power savings, the increase in frequency may be necessary to help avoid a temperature cycle event.

Of course, if the specific processor begins to cool off further, then management control unit 310 may use a first low threshold to decrease the fan speed using fan speed adjustor 318. Similarly, while the first low threshold and the second low threshold may be the same threshold, the first low threshold may be set at a predetermined level higher than the second low threshold to account for the response time required to control the fan speed, as described previously. Then the specific processor, as well as other components that may be near their thermal minimums, would begin to heat up to above the thermal minimum. Once the temperature of the data processing system is within the nominal temperature range of the data processing system, the frequency of the specific processor may be reduced again using frequency adjustor 314 and the fan speed may be returned to a normal speed, thereby saving power.

Figure 4:
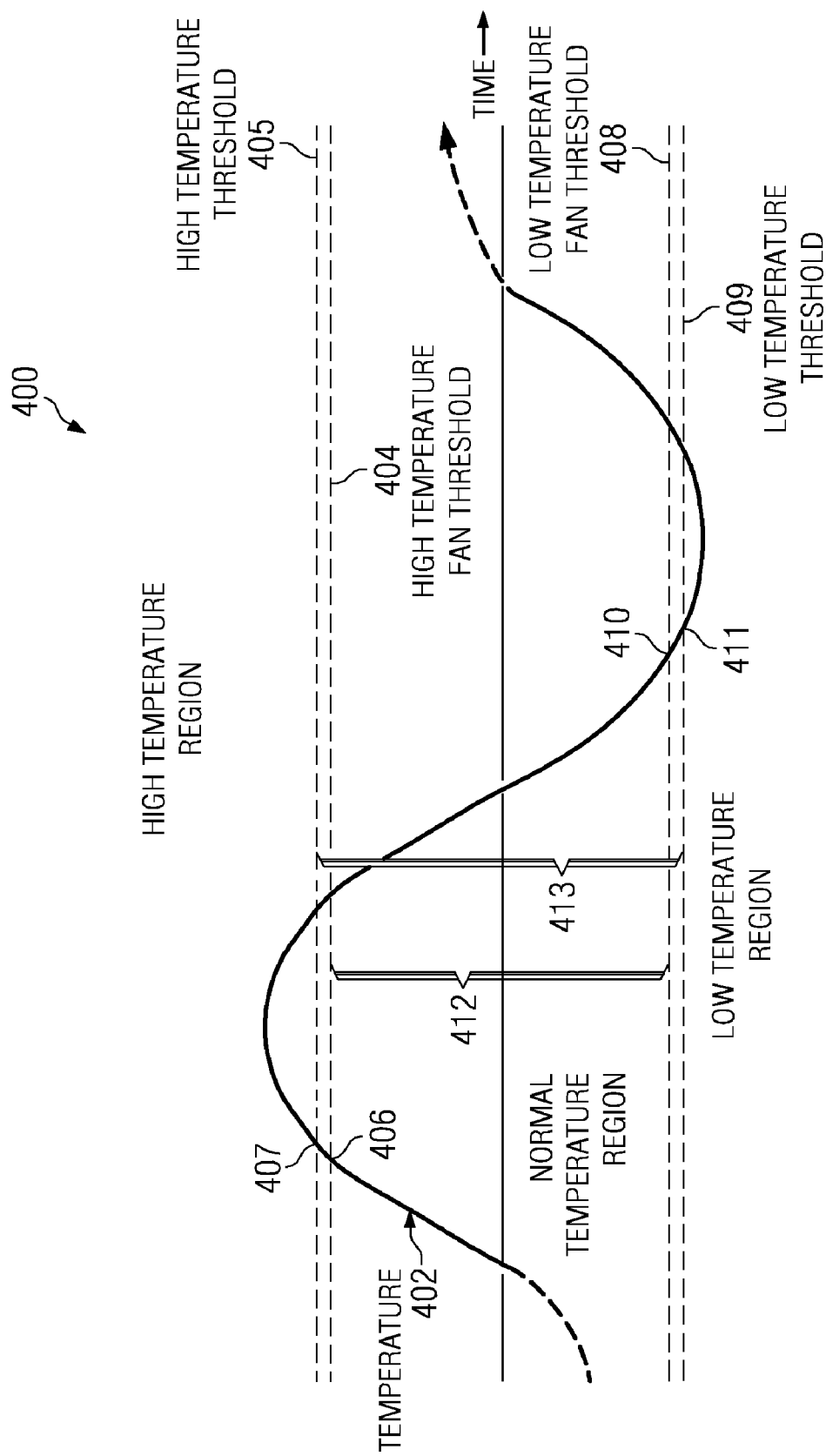
FIG. 4 depicts an exemplary graph illustrating a fluctuation in temperature within a data processing system in accordance with an illustrative embodiment.

Management control unit 310 may be applied for both power and thermal management for each critical component (or subsystem on a chip, as with multi-core processors) so that management control system 310 may directly target the thermal and power boundaries and hold to them. While management control unit 310 is shown to use values from power sensors 304, utilization sensors 306, and thermal sensors 308 to control voltage adjustor 312, frequency adjustor 314, throttle adjustor 316, and fan speed adjustor 318, the illustrative embodiments recognize that any type of sensor may provide values to management control unit 310 and management control unit 310 may use any type of adjustor to mitigate the effects of delamination of organic packages in a data processing system due to thermal stress while allowing as much power as possible to be saved in the data processing system FIG. 4 depicts an exemplary graph illustrating a fluctuation in temperature within a data processing system in accordance with an illustrative embodiment. In graph 400, when temperature value 402 rises above high temperature fan threshold 404 at point 406, then the management control unit may act to increase the fan speed. Further, when temperature value 402 rises above high temperature threshold 405 at point 407, then the management control unit may act to decrease power, workload, and/or frequency to the affected components. Again, high temperature fan threshold 404 and high temperature threshold 405 may be the same threshold or high temperature fan threshold 404 may be set at a predetermined level lower than high temperature threshold 405 to account for the response time required to control the fan speed.

Similarly, when temperature value 402 falls below low temperature fan threshold 408 at point 410, then the management control unit may act to decrease the fan speed. When temperature value 402 falls below low temperature threshold 409 at point 411, then the management control unit may act to increase power, workload, and/or frequency to the affected components. Again, low temperature fan threshold 408 and low temperature threshold 409 may be the same threshold or low temperature fan threshold 408 may be set at a predetermined level higher than low temperature threshold 409 to account for the response time required to control the fan speed.

When temperature value 402 is within region 412, which is between high temperature fan threshold 404 and low temperature fan threshold 408, then the management control unit may normalize the fan to operate at a normal speed. When temperature value 402 is within region 413, which is between high temperature threshold 405 and low temperature threshold 409, then the management control unit may normalize the power, workload, and frequency of the components within the data processing system.

Figure 5:
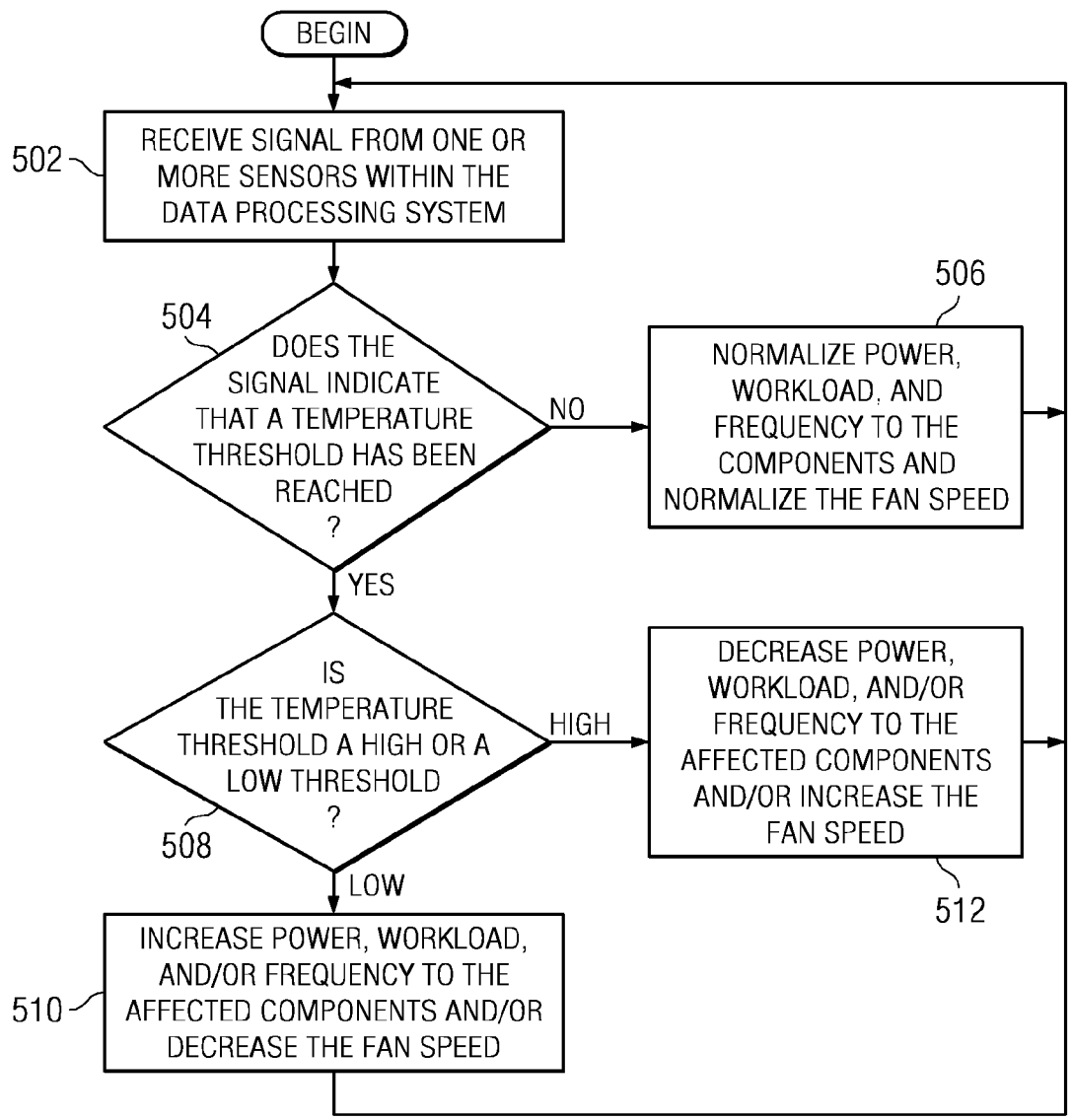
FIG. 5 is a flowchart outlining an exemplary operation for mitigating the effects of delamination of organic packages in a data processing system in accordance with an illustrative embodiment.

FIG. 5 is a flowchart outlining an exemplary operation for mitigating the effects of delamination of organic packages in a data processing system in accordance with an illustrative embodiment. As the operation begins, a management control unit within a data processing system receives a signal from one or more sensors within the data processing system (step 502). The management control unit determines if the signal indicates that a temperature threshold has been reached or exceeded, whether high or low (step 504). If at step 504 the signal fails to indicate that a temperature threshold has been reached or exceeded, then the management control unit allows the components within the data processing system to operate at normal levels (step 506), with the operation returning to step 502 thereafter. That is, the management control unit does not act to control the power, frequency, or workload of any component in the data processing system or to change the fan speed of the data processing system.

If at step 504 the signal indicates that a temperature threshold has been reached or exceeded, then the management control unit determines if the temperature threshold that has been reached or exceeded is a low threshold or a high threshold (step 508). If at step 508, the temperature threshold that has been reached or exceeded is a low threshold, then the management control unit acts to increase power, workload, and/or frequency to the affected components and/or decrease the fan speed (step 510), with the operation returning to step 502 thereafter. If at step 508, the temperature threshold that has been reached or exceeded is a high threshold, then the management control unit acts to decrease power, workload, and/or frequency to the affected components and/or increase the fan speed (step 512), with the operation returning to step 502 thereafter.

Thus, the illustrative embodiments provide mechanisms for mitigating the effects of delamination of organic packages in a data processing system due to thermal stress while allowing as much power as possible to be saved in the data processing system. If a low temperature threshold is reached or exceeded, then the management control unit acts to increase power, workload, and/or frequency to the affected components and/or decrease the fan speed. If a high temperature threshold is reached or exceeded, then the management control unit acts to decrease power, workload, and/or frequency to the affected components and/or increase the fan speed.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for mitigating effects of delamination of components in the data processing system, the method comprising:
receiving a set of signals from one or more sensors in the data processing system;
determining whether a first signal indicates that a threshold in a plurality of thresholds has been reached or exceeded;
responsive to the first signal indicating that the first threshold in the plurality of thresholds has been reached or exceeded, determining whether the first threshold is a low temperature fan threshold or a high temperature fan threshold;
responsive to the first threshold being the low temperature fan threshold, decreasing a fan speed of the data processing system in order to increase a temperature of the data processing system thereby mitigating effects of delamination of the components in the data processing system;
determining whether a second signal indicates that a second threshold in the plurality of thresholds has been reached or exceeded;
responsive to the second signal indicating that the second threshold in the plurality of thresholds has been reached or exceeded, determining whether the second threshold is a low temperature threshold or a high temperature threshold; and
responsive to the second threshold being the low temperature threshold, initiating one of a plurality of actions to increase the temperature of the data processing system thereby mitigating effects of delamination of the components in the data processing system, wherein the low temperature fan threshold is set at a predetermined level higher than the low temperature threshold to account for a response time required to control the fan speed.

2. The method of claim 1, wherein the plurality of actions to increase the temperature of the data processing system comprises at least one of increasing power to one or more of the components in the data processing system or increasing frequency to one or more of the components in the data processing system.

3. The method of claim 1, wherein, responsive to the second threshold being the low temperature threshold, initiating two or more of the plurality of actions to increase the temperature of the data processing system thereby mitigating the effects of delamination of the components in the data processing system.

4. The method of claim 1, further comprising:
responsive to the first threshold being the high temperature fan threshold, increasing a fan speed of the data processing system in order to decrease the temperature of the data processing system thereby mitigating effects of delamination of the components in the data processing system;
responsive to the second threshold being the high temperature threshold, initiating one of a plurality of actions to decrease the temperature of the data processing system thereby mitigating the effects of delamination of the components in the data processing system, wherein the high temperature fan threshold is set at a predetermined level lower than the high temperature threshold to account for a response time required to control the fan speed.

5. The method of claim 4, wherein the plurality of actions to decrease the temperature of the data processing system comprises at least one of decreasing power to one or more of the components in the data processing system or decreasing frequency to one or more of the components in the data processing system.

6. The method of claim 4, wherein, responsive to the second threshold being the high temperature threshold, initiating two or more of the plurality of actions to decrease the temperature of the data processing system thereby mitigating the effects of delamination of the components in the data processing system.

7. The method of claim 1, further comprising:
responsive to the set of signals failing to indicate that a threshold in the plurality of thresholds has been reached or exceeded, normalizing power to the components in the data processing system, normalizing workload to one or more of the components in the data processing system, normalizing frequency to one or more of the components in the data processing system, and normalizing the fan speed of the data processing system.

8. The method of claim 1, wherein the set of signals from the one or more sensors is from at least one of a group comprising power sensors, utilization sensors, or thermal sensors.

9. A computer program product comprising a computer recordable medium having a computer readable program recorded thereon, wherein the computer readable program, when executed on a computing device, causes the computing device to:
receive a set of signals from one or more sensors in the data processing system;
determine whether a first signal indicates that a first threshold in a plurality of thresholds has been reached or exceeded;
responsive to the first signal indicating that the first threshold in the plurality of thresholds has been reached or exceeded, determine whether the first threshold is a low temperature fan threshold or a high temperature fan threshold;
responsive to the first threshold being the low temperature fan threshold, decrease a fan speed of the data processing system in order to increase a temperature of the data processing system thereby mitigating effects of delamination of the components in the data processing system;
determine whether a second signal indicates that a second threshold in the plurality of thresholds has been reached or exceeded;
responsive to the second signal indicating that the second threshold in the plurality of thresholds has been reached or exceeded, whether the second threshold is a low temperature threshold or a high temperature threshold; and
responsive to the second threshold being the low temperature threshold, initiate one of a plurality of actions to increase the temperature of the data processing system thereby mitigating effects of delamination of the components in the data processing system, wherein the low temperature fan threshold is set at a predetermined level higher than the low temperature threshold to account for a response time required to control the fan speed.

10. The computer program product of claim 9, wherein the plurality of actions to increase the temperature of the data processing system comprises at least one of increasing power to one or more of the components in the data processsing system, or increasing frequency to one or more of the components in the data processing system.

11. The computer program product of claim 9, wherein the computer readable program further causes the computing device to:
responsive to the first threshold being the high temperature fan threshold, increase the fan speed of the data processing system in order to decrease the temperature of the data processing system thereby mitigating effects of delamination of the components in the data processing system;
responsive to the second threshold being the high temperature threshold, initiating one of a plurality of actions to decrease the temperature of the data processing system thereby mitigating the effects of delamination of the components in the data processing system, wherein the high temperature fan threshold is set at a predetermined level lower than the high temperature threshold to account for a response time required to control the fan speed.

12. The computer program product of claim 11, wherein the plurality of actions to decrease the temperature of the data processing system comprises at least one of decreasing power to one or more of the components in the data processing system or decreasing frequency to one or more of the components in the data processing system.

13. An apparatus, comprising:
a processor; and
a memory coupled to the processor, wherein the memory comprises instructions which, when executed by the processor, cause the processor to:
receive a set of signals from one or more sensors in the data processing system;
determine whether a first signal indicates that a first threshold in a plurality of thresholds has been reached or exceeded;
responsive to the first signal indicating that the first threshold in the plurality of thresholds has been reached or exceeded, determine whether the first threshold is a low temperature fan threshold or a high temperature fan threshold;
responsive to the first threshold being the low temperature fan threshold, decrease a fan seed of the data processing system in order to increase a temperature of the data processing system thereby mitigating effects of delamination of the components in the data processing system;
determine whether a second signal indicates that a second threshold in the plurality of thresholds has been reached or exceeded;
responsive to the second signal indicating that the second threshold in the plurality of thresholds has been reached or exceeded, whether the second threshold is a low temperature threshold or a high temperature threshold; and responsive to the second threshold being the low temperature threshold, initiate one of a plurality of actions to increase the temperature of the data processing system thereby mitigating effects of delamination of the components in the data processing system, wherein the low temperature fan threshold is set at a predetermined level higher than the low temperature threshold to account for a response time required to control the fan speed.

14. The apparatus of claim 13, wherein the plurality of actions to increase the temperature of the data processing system comprises at least one of increasing power to one or more of the components in the data processing system or increasing frequency to one or more of the components in the data processing system.

15. The apparatus of claim 13, wherein the instructions further cause the processor to:
responsive to the first threshold being the high temperature fan threshold, increase the fan speed of the data processing system in order to decrease the temperature of the data processing system thereby mitigating effects of delamination of the components in the data processing system;
responsive to the second threshold being the high temperature threshold, initiating one of a plurality of actions to decrease the temperature of the data processing system thereby mitigating the effects of delamination of the components in the data processing system, wherein the high temperature fan threshold is set at a predetermined level lower than the high temperature threshold to account for a response time required to control the fan speed.

16. The apparatus of claim 15, wherein the plurality of actions to decrease the temperature of the data processing system comprises at least one of decreasing power to one or more of the components in the data processing system or decreasing frequency to one or more of the components in the data processing system.

17. The method of claim 1, wherein the plurality of actions to increase the temperature of the data processing system comprises increasing workload to one or more of the components in the data processing system.

18. The method of claim 4, wherein the plurality of actions to decrease the temperature of the data processing system comprises decreasing workload to one or more of the components in the data processing system.

19. The computer program product of claim 9, wherein the plurality of actions to increase the temperature of the data processing system comprises increasing workload to one or more of the components in the data processing system.

20. The computer program product of claim 11, wherein the plurality of actions to decrease the temperature of the data processing system comprises decreasing workload to one or more of the components in the data processing system.

21. The apparatus of claim 13, wherein the plurality of actions to increase the temperature of the data processing system comprises increasing workload to one or more of the components in the data processing system.

22. The apparatus of claim 15, wherein the plurality of actions to decrease the temperature of the data processing system comprises decreasing workload to one or more of the components in the data processing system.

* * * * *